Patented Jan. 2, 1934

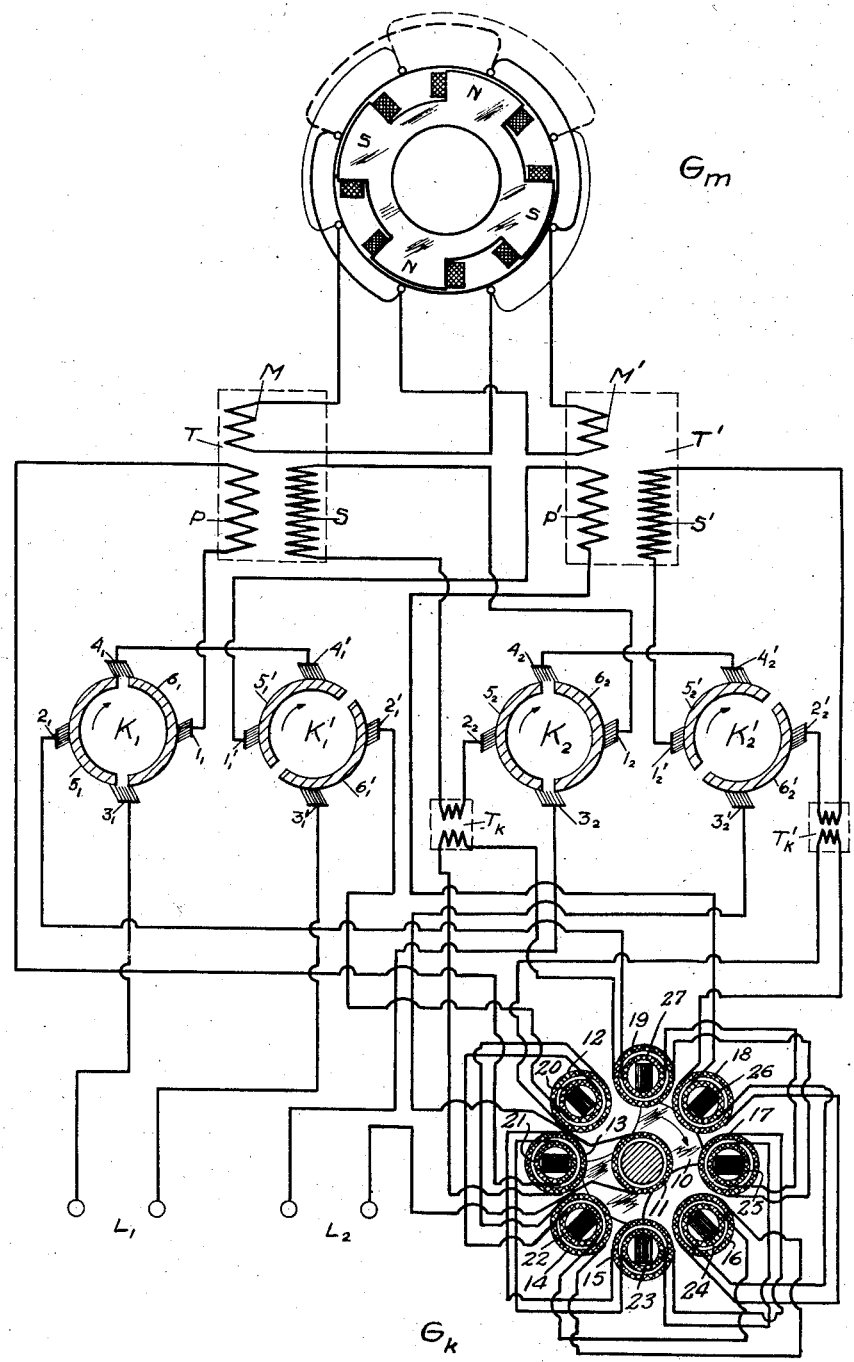

1,941,643

UNITED STATES PATENT OFFICE 1,941,643

DIRECT CURRENT TRANSFORMER SYSTEM

Baltzar Carl von Platen, Stockholm, Sweden

Application July 22, 1931, Serial No. 552,338, and in Sweden July 23, 1930

24 Claims. (Cl. 171—123)

My invention refers to a method of and means for converting direct current of a certain voltage into direct current of another voltage.

According to the invention the direct current is, by means of a commutator, converted into alternating current which is passed through one winding of a static transformer, i. e. the primary winding thereof. At the same time alternating current is withdrawn from the secondary winding of the transformer which is then rectified by a commutator. Besides the abovementioned two windings, the primary and the secondary windings, the transformer is provided with a further winding, through which, on operation of the device, an alternating current of the same frequency as the alternating current passing through the primary winding of the transformer is passing, thus causing a pulsating magnetic flux in the transformer.

In order to obtain a direct current transformer giving as constant a voltage and current as possible, it is advantageous to combine two or more transformer systems of the kind set forth.

The invention will be more clearly described with reference to the embodiment thereof shown by way of example in the accompanying drawing schematically showing a diagram of connections, referring to said embodiment.

In the drawing reference characters T and T' designate two transformers, each provided with three separated windings which will be described in detail for the transformer T, the windings and their connections for the transformer T' being analogous thereto. The primary and secondary windings of the transformer T are designated by P and S respectively, and the third winding, the exciting winding, is designated by reference character M. The exciting winding is connected to an exciting generator $G_m$. The winding P is connected with a commutator $K_1$ and the winding S with a commutator $K_2$, as shown in the drawing. The primary circuit P—$K_1$ and the secondary circuit S—$K_2$ are provided with a commutating generator $G_k$ common to both circuits, and to which also the windings of the transformer T' are connected in a corresponding manner. This connection may be made directly or by means of transformers. In the embodiment shown in the diagram said connections of both transformers for their high-voltage secondary side are made by means of transformers $T_k$ and $T'_k$. The generator $G_k$ which in the embodiment shown is excited by line $L_2$ is of a type described in my co-pending patent application Serial No. 503,711, but may evidently also be of a different type.

The generator $G_k$ comprises a rotor 10 of magnetic material which rotates in synchronism with commutators $K_1$, $K'_1$, $K_2$ and $K'_2$. This rotor is excited by a winding 11 which is connected in series with line $L_2$ whereby the excitation is proportional to the current in said line.

The generator is also provided with a number of induced windings 12 to 27 of which windings 12 to 19 cooperate with commutators $K_2$, $K'_2$ and windings 20 to 27 cooperate with commutators $K_1$, $K'_1$ as will be further described. Windings 20, 22, 24, 26 are connected in series between brush $2'_1$ and primary $P'$ of the transformer T'. Windings 21, 23, 25, 27 are connected in series between brush $2_1$ and primary P of transformer T. Windings 13, 15, 17, 19 are connected through transformer $T_k$ in series with brush $2_2$ and secondary S and windings 12, 14, 16, 18 are connected through transformer $T'_k$ in series with brush $2'_2$ and secondary S'.

The rotating field produced by rotor 10 is such that voltages are induced in the respective windings 12 to 27 to assist commutation at the various commutators $K_1$, $K'_1$, $K_2$ and $K'_2$ and to thereby cause the commutators to operate without undesired sparking. Obviously if sparking does not occur or is corrected by other means the commutation generator $G_k$ may be omitted.

The exciting generator $G_m$ is of the usual two-phase synchronous type, its voltage-curve being formed by rectangles separated by zero-potential intervals of the same length as the periods of constant voltage. The generator may be separately excited or receive its excitation from the one or the other of the direct current lines $L_1$ and $L_2$, connected to the device.

Four contact-brushes, 1, 2, 3 and 4, cooperate with two rotatable commutator segments 5 and 6 constituting each of the commutators $K_1$ and $K_2$. Index 1 designates the brushes and segments of the commutator $K_1$ and index 2 corresponding parts of the commutator $K_2$. The brush $3_1$ is connected with a direct current generating line $L_1$, and the brush $4_1$ with the corresponding brush $4'_1$ of the other system connected with transformer T' (see below). Brush $1_1$ is directly connected to the primary winding P and brush $2_1$ is connected to the opposite end of the same winding through the windings of the commutating generator $G_k$ as above described. Brush $3_2$ is connected to the direct current receiving line $L_2$, brush $4_2$ to the brush $4'_2$ (see below), brush $1_2$ directly to the secondary winding S and brush $2_2$ to the opposite end of same winding through windings of generator $G_k$.

Such parts of the device, which are connected with transformer $T'$, are designated in the drawing by an accent, the reference characters being analogous to those for the corresponding parts above described. The parts of the device connected to the transformer $T'$ are similar to but angularly displaced with respect to the parts connected with transformer $T$, the commutator segments $5'_1$, $6'_1$ and $5'_2$, $6'_2$ being angularly displaced by 45° relatively to the commutator segments $5_1$, $6_1$ and $5_2$, $6_2$, respectively.

The operation of the device is as follows:—

The segments of the commutators $K_1$, $K_2$, $K'_1$ and $K'_2$ are rotated synchronously, thereby maintaining the mutual angular positions shown in the drawing. A constant voltage is applied to brushes $3_1$ and $3'_1$. On rotating the generator $G_m$ exciting currents are generated which produce magnetic flux in the iron cores of the transformers, thus setting up voltages in the windings thereof. Generator $G_m$ is so devised, that the voltages set up in the primary windings $P$ and $P'$ are oppositely directed with respect to and of equal magnitude to the voltages supplied at uniform intervals by commutators $K_1$ and $K'_1$ from the line $L_1$ to windings $P$ and $P'$.

If brushes $3_2$ and $3'_2$ are interconnected by a resistance or the like, such as the line $L_2$, a current is induced in the one or other of windings $S$ and $S'$ due to transformer action in transformers $T$ and $T'$, which current corresponds to the current supplied to the primary sides of the transformers from line $L_1$. This action will be clear from the following. Considering the positions shown in the drawing, and supposing that the primary current in that moment enters brush $3_1$, which simultaneously with brush $4_1$ short-circuits segments $5_1$ and $6_1$, the current will directly pass commutator $K_1$ to brushes $4_1$ and $4'_1$, thereafter pass segment $5'_1$ and brush $1'_1$ to primary winding $P'$ and commutating generator $G_k$, which, however, in this moment does not set up any voltage in the circuit, and from generator $G_k$ pass back through brush $2'_1$, segment $6'_1$ and brush $3'_1$ to line $L_1$. The transformer $T'$ is simultaneously excited by generator $G_m$ and in the secondary winding $S'$ of said transformer a current will therefore be produced for the circuit $L_2$—$3_2$—$4_2$—$4'_2$—$5'_2$—$1'_2$—$S'$—$G_k$—$2'_2$—$6'_2$—$3'_2$—$L_2$.

The course of action described continues until the rotating parts of the commutators have turned in the direction, indicated in the drawing by arrows, to an angular position, in which the short-circuiting of segments $5_1$, $6_1$ and $5_2$, $6_2$ respectively has ceased, and segments $5'_1$, $6'_1$ and $5'_2$, $6'_2$ respectively are short-circuited by brushes $2'_1$, $1'_1$ and $2'_2$, $1'_2$ respectively. The action above described is repeated, whilst transformer $T$ is connected to lines $L_1$ and $L_2$ and the windings of transformer $T'$ are closed by the commutating generator and the commutators. In the windings of the commutating generator in that moment, as is more clearly described in my copending application Serial No. 503,711, voltages of such magnitude are set up that the current through windings $P'$ and $S'$ will reverse its direction of flow. The breaking of the short-circuiting of segments $5'_1$, $6'_1$ and $5'_2$, $6'_2$ respectively may therefore take place without inconvenient sparking at commutators $K'_1$ and $K'_2$. The segments $5'_1$, $6_1$ and $5_2$, $6_2$ respectively are again short-circuited, and the parts of the device connected to transformer $T$ will again take over the action. The functioning will be analogous to that above described, whereas the currents now, of described the one or the other of the parts of the course, have opposite directions. In the manner device connected to transformer $T$ and $T'$ respectively, will act alternately. Thereby direct current is supplied by net-work $L_1$ and withdrawn from net-work $L_2$, the relation between the voltages supplied and obtained being determined by the ratio of voltages in transformers $T$ and $T'$.

The device described may, of course, be modified in various manners within the scope of the invention. It may, for instance, be used for transforming the voltage in direct current lines to a higher voltage as well as to a lower voltage.

The commutating generator $G_k$ may be constructed in different ways, for instance as a usual two-phase or a polyphase generator or be of the type described in the copending application Serial No. 312,913, whereby, of course, the windings of the generator, instead of being provided with commutators as shown in the specification referred to, are directly connected to the primary and secondary circuits of the transformer. The number of winding systems may, of course, also be determined with respect to the requirements in each individual case.

It is to be understood that a preferred embodiment of the invention has been disclosed herein for purposes of illustration only and that various changes, substitutions and modifications may be made as will be apparent to a person skilled in the art. The invention is only to be limited in accordance with the following claims but interpreted in view of the prior art.

I claim:

1. A direct current transformer system comprising a plurality of transformers having primary and secondary windings and magnetizing windings in induced relationship, a direct current source, a reversing means associated with each of said primaries, means connecting said primaries, through said reversing means, in series to said direct current source, said reversing means being displaced in phase whereby the currents in said primaries are similarly displaced in phase, means supplying to each of said magnetizing windings a current synchronous with and in phase with the current in the corresponding primary, reversing means synchronous with said first reversing means associated with each of said secondaries and means connecting said secondaries, through said second reversing means, in series to form a main secondary direct current line.

2. A direct current transformer system comprising a plurality of transformers having primary, secondary and magnetizing windings, a separate reversing commutator connected to each of said primary and secondary windings, means including said commutators connecting said primaries and said secondaries respectively in series, the reversing commutators associated with the different transformers being displaced in phase and means supplying to said magnetizing windings currents synchronous with and in phase with the currents in the corresponding primary windings.

3. A direct current transformer system comprising a plurality of transformers having primary, secondary and magnetizing windings, a separate reversing commutator connected to each of said primary and secondary windings, means including said commutators connecting said primaries and said secondaries respectively in series, the reversing commutators associated with the different transformers being displaced in phase and means supplying to said magnetizing windings currents synchronous with and in phase with the currents in the corresponding primary windings, and a commutation generator having induced windings connected in series with each of said primary and secondary windings and adapted to correct the commutation voltage of said primary and secondary windings.

4. A transformer having primary and secondary windings in induced relationship, means to produce an alternating magnetizing flux in induced relationship to said primary and secondary windings, a source of direct current, means supplying said current to said primary winding and means to periodically short-circuit said winding and reverse the current therein in synchronism with said alternating magnetizing flux.

5. A transformer having primary and secondary windings in induced relationship, means to produce an alternating magnetizing flux in induced relationship to said primary and secondary windings, a source of direct current, means supplying said current to said primary winding, means to periodically short circuit said winding and reverse the current therein in synchronism with said alternating magnetizing flux and means synchronous with said first reversing means to periodically short-circuit and reverse said secondary winding to thereby produce a substantially constant unidirectional current therefrom.

6. A direct current transformer system comprising a plurality of static transformers, each having primary, secondary and magnetizing windings in induced relationship, a source of alternating magnetizing current, means supplying said current to each of said magnetizing windings in different phase relationship, a source of direct current, means supplying said current in series to all of said primaries and independent means to periodically short circuit and reverse the current in each of said primaries in synchronism with the respective magnetizing currents, and means synchronous with said first reversing means to rectify the currents in each of said secondaries and to connect all of said secondaries in series.

7. A direct current transformer system comprising a plurality of static transformers, each having primary and secondary windings in induced relationship, means to induce an alternating magnetizing flux in each of said transformers, the flux in the several transformers being displaced in phase, a source of direct current, means supplying said current to all of said primaries and independent means to periodically short circuit and reverse the current in each of said primaries in synchronism with the respective magnetizing fluxes.

8. A direct current transformer system comprising a plurality of static transformers, each having primary and secondary windings in induced relationship, means to induce an alternating magnetizing flux in each of said transformers, the flux in the several transformers being displaced in phase, a source of direct current, means supplying said current in series to all of said primaries and independent means to periodically short circuit and reverse the current in each of said primaries in synchronism with the respective magnetizing fluxes.

9. A direct current transformer system comprising a plurality of static transformers, each having primary and secondary windings in induced relationship, means to induce an alternating magnetizing flux in each of said transformers, the flux in the several transformers being displaced in phase, a source of direct current, means supplying said current to all of said primaries and independent means to periodically short circuit and reverse the current in each of said primaries in synchronism with the respective magnetizing fluxes, and means synchronous with said first reversing means to periodically short circuit and reverse the currents in said secondaries.

10. A direct current transformer system comprising a plurality of static transformers, each having primary and secondary windings in induced relationship, means to induce an alternating magnetizing flux in each of said transformers, the flux in the several transformers being displaced in phase, a source of direct current, means supplying said current in series to all of said primaries and independent means to periodically short circuit and reverse the current in each of said primaries in synchronism with the respective magnetizing fluxes, means connecting said secondaries in series and means synchronous with said first reversing means to periodically short circuit and reverse said secondaries to thereby produce a unidirectional substantially constant current.

11. A direct current transformer system comprising a plurality of static transformers, each having primary, secondary and magnetizing windings in induced relationship, a source of alternating magnetizing current, means supplying said current to each of said magnetizing windings in different phase relationship, a source of direct current, means supplying said current in series to all of said primaries and independent means to periodically short circuit and reverse the current in each of said primaries in synchronism with the respective magnetizing currents, means synchronous with said first reversing means to rectify the currents in each of said secondaries and to connect all of said secondaries in series and independent means to supply to each of said primary and secondary windings a voltage to assist commutation thereof and to minimize sparking.

12. The method of operating a direct current transformer system including a static transformer and commutating means which comprises inducing in the transformer an alternating magnetizing flux, supplying current from a direct current source to the transformer primary and periodically short-circuiting and reversing the primary in synchronism with said alternating flux.

13. The method of operating a direct current transformer system including a static transformer and commutating means which comprises inducing in the transformer an alternating magnetizing flux, supplying current from a direct current source to the transformer primary and periodically short-circuiting and reversing the primary in synchronism with said alternating flux, and periodically short-circuiting and reversing the secondary to produce a substantially direct current therefrom.

14. The method of operating a direct current transformer system including a plurality of static transformers which comprises inducing in each of said transformers a magnetizing flux, the fluxes in the various transformers being relatively displaced in phase, supplying current from a direct current source in series to all of the transformer primaries, independently and periodically short-circuiting and reversing each of said primaries in synchronism with the respective magnetizing fluxes and causing corresponding reversals in the secondaries to thereby produce a unidirectional current therefrom.

15. The method of operating a direct current transformer system including a plurality of static transformers which comprises inducing in each of said transformers a magnetizing flux, the fluxes in the various transformers being relatively displaced in phase, supplying current from a direct current source to all of the transformer primaries, independently and periodically short-circuiting and reversing each of said primaries in synchronism with the respective magnetizing fluxes and causing corresponding reversals in the secondaries to thereby produce a unidirectional current therefrom.

16. The method of operating a direct current transformer system including a plurality of static transformers which comprises inducing in each of said transformers a magnetizing flux, the fluxes in the various transformers being relatively displaced in phase, supplying current from a direct current source in series to all of the transformer primaries, independently and periodically reversing each of said primaries in synchronism with the respective magnetizing fluxes and causing corresponding reversals in the secondaries to thereby produce a unidirectional current therefrom.

17. The method of operating a direct current transformer system including a plurality of static transformers which comprises inducing in each of said transformers a magnetizing flux, the fluxes in the various transformers being relatively displaced in phase, supplying current from a direct current source in series to all of the transformer primaries, independently and periodically short-circuiting and reversing each of said primaries in synchronism with the respective magnetizing fluxes and causing corresponding reversals in the secondaries to thereby produce a unidirectional current therefrom and supplying to the primaries and secondaries an additional voltage to assist commutation and to prevent sparking.

18. A direct current transformer system comprising a plurality of static transformers, each having primary and secondary windings, a source of direct current, means supplying said current in series to all of said primary windings, commutators adapted to periodically reverse the connections to each primary winding, the different commutators being relatively displaced in phase whereby the reversals in the different primary windings occur in timed sequence, and a commutating generator having armature windings connected respectively in series with said primary windings, a rotor of magnetic material in induced relationship to said armature windings, an exciting winding for said rotor connected in series with one of the main direct current circuits of said system, said rotor operating in synchronism with said commutators to induce a voltage in said armature windings to assist commutation of said primary windings.

19. A direct current transformer system comprising a plurality of static transformers, each having primary and secondary windings, a source of direct current, means supplying said current in series to all of said primary windings, commutators adapted to periodically reverse the connections to each primary winding, and a commutating generator having armature windings connected respectively in series with said primary windings, a rotor of magnetic material in induced relationship to said armature windings, said rotor operating in synchronism with said commutators to induce a voltage in said armature windings to assist commutation of said primary windings.

20. A direct current transformer system comprising a plurality of static transformers, each having primary and secondary windings, a source of direct current, means supplying said current in series to all of said primary windings, commutators adapted to periodically reverse the connections to each primary winding, the different commutators being relatively displaced in phase whereby the reversals in the different primary windings occur in timed sequence, a commutating generator having armature windings connected respectively in series with said primary windings, said armature windings being peripherally displaced and arranged in groups, the windings of each group being connected in series with one of said first windings, and means to induce in said armature windings voltages having phase characteristics adapted to assist commutation of said first windings.

21. A direct current transformer system comprising a plurality of static transformers, each having primary and secondary windings, a source of direct current, means supplying said current in series to all of said primary windings, commutators adapted to periodically reverse the connections to each primary winding, the different commutators being relatively displaced in phase whereby the reversals in the different primary windings occur in timed sequence, a commutating generator having armature windings connected respectively in series with said primary windings, said armature windings being peripherally displaced and respectively connected in series with said first windings, and means to induce in said armature windings voltages having phase characteristics adapted to assist commutation of said first windings.

22. A direct current transformer system comprising a plurality of static transformers, each having primary and secondary windings, a source of direct current, means supplying said current in series to all of said primary windings, commutators adapted to periodically reverse the connections to each primary winding, the different commutators being relatively displaced in phase whereby the reversals in the different primary windings occur in timed sequence, commutators synchronous with said first commutators adapted to periodically reverse the connections to the respective secondary windings, means including said last mentioned commutators connecting said secondary windings in series in a direct current circuit, a commutating generator having armature windings connected respectively in series with said primary and secondary windings, a rotor of magnetic material in induced relationship to said armature windings, an exciting winding for said rotor connected in series with one of the main direct current circuits of said system, said rotor operating in synchronism with said commutators to induce a voltage in said armature windings to assist commutation of said primary and secondary windings.

23. A direct current transformer system comprising a plurality of static transformers, each having primary and secondary windings, a source of direct current, means supplying said current in series to all of said primary windings, commutators adapted to periodically reverse the connections to each primary winding, the different commutators being relatively displaced in phase whereby the reversals in the different primary windings occur in timed sequence, commutators synchronous with said first commutators adapted to periodically reverse the connections to the respective secondary windings, means including said last mentioned commutators connecting said secondary windings in series in a direct current circuit, a commutating generator having armature windings connected respectively in series with said primary and secondary windings, said armature windings being peripherally displaced and respectively connected in series with said primary and secondary windings, and means to induce in said armature windings voltages having phase characteristics to assist commutation of said first windings.

24. A direct current transformer system comprising a plurality of static transformers, each having primary and secondary windings, a source of direct current, means supplying said current in series to all of said primary windings, commutators adapted to periodically reverse the connections to each primary winding, the different commutators being relatively displaced in phase whereby the reversals in the different primary windings occur in timed sequence, commutators synchronous with said first commutators adapted to periodically reverse the connections to the respective secondary windings, means including said last mentioned commutators connecting said secondary windings in series in a direct current circuit, a commutating generator having armature windings connected respectively in series with said primary and secondary windings, said armature windings being peripherally displaced and arranged in groups, the windings of each group being respectively connected in series with said primary and secondary windings, and means to induce in said armature windings voltages having phase characteristics to assist commutation of said first windings.

BALTZAR CARL von PLATEN.